United States Patent

[11] 3,577,698

| [72] | Inventor | Herbert S. Ruekberg<br>Highland Park, Ill. |
|---|---|---|
| [21] | Appl. No. | 736,139 |
| [22] | Filed | June 11, 1968 |
| [45] | Patented | May 4, 1971 |
| [73] | Assignee | Continental Can Company, Inc.<br>New York, N.Y. |

[54] METHOD AND MEANS FOR FILLING AND SEALING A FLEXIBLE CONTAINER
10 Claims, 8 Drawing Figs.

| [52] | U.S. Cl. | 53/37 |
|---|---|---|
| [51] | Int. Cl. | B65b 3/04 |
| [50] | Field of Search | 53/22, 22 (A), 22 (B), 37 |

[56] References Cited
UNITED STATES PATENTS

| 2,329,311 | 9/1943 | Waters | 53/37X |
|---|---|---|---|
| 3,103,089 | 9/1963 | Allen | 53/40X |
| 3,342,009 | 9/1967 | Anderson | 53/22 |

Primary Examiner—H. A. Kilby, Jr.
Attorney—Americus Mitchell, Joseph E. Kerwin and William A. Dittmann ABSTRACT: A means and process for filling a plastic bottle with a premeasured amount of liquid, squeezing the plastic bottle until the level of liquid in the bottle comes to a predetermined height and then capping and sealing the bottle.

PATENTED MAY 4 1971
3,577,698
SHEET 1 OF 3
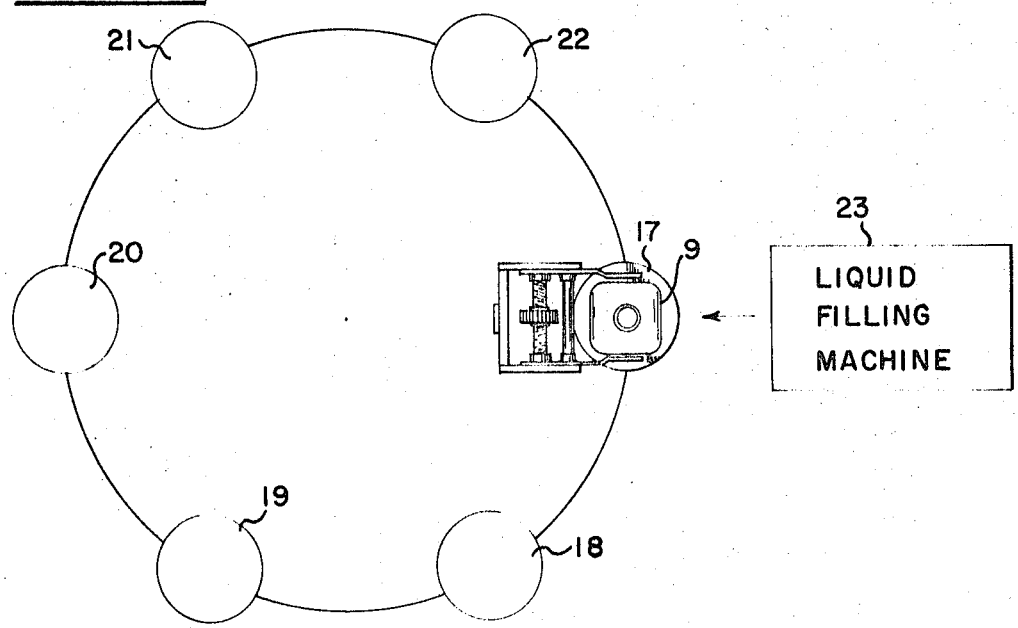
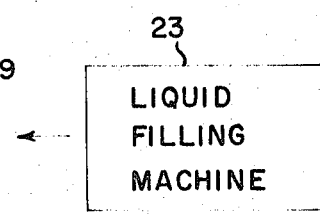
FIG. 2.
FIG. 1.
FIG. 3.
INVENTOR
HERBERT S. RUEKBERG
BY Americus Mitchell
ATT'Y.

PATENTED MAY 4 1971
3,577,698
SHEET 2 OF 3
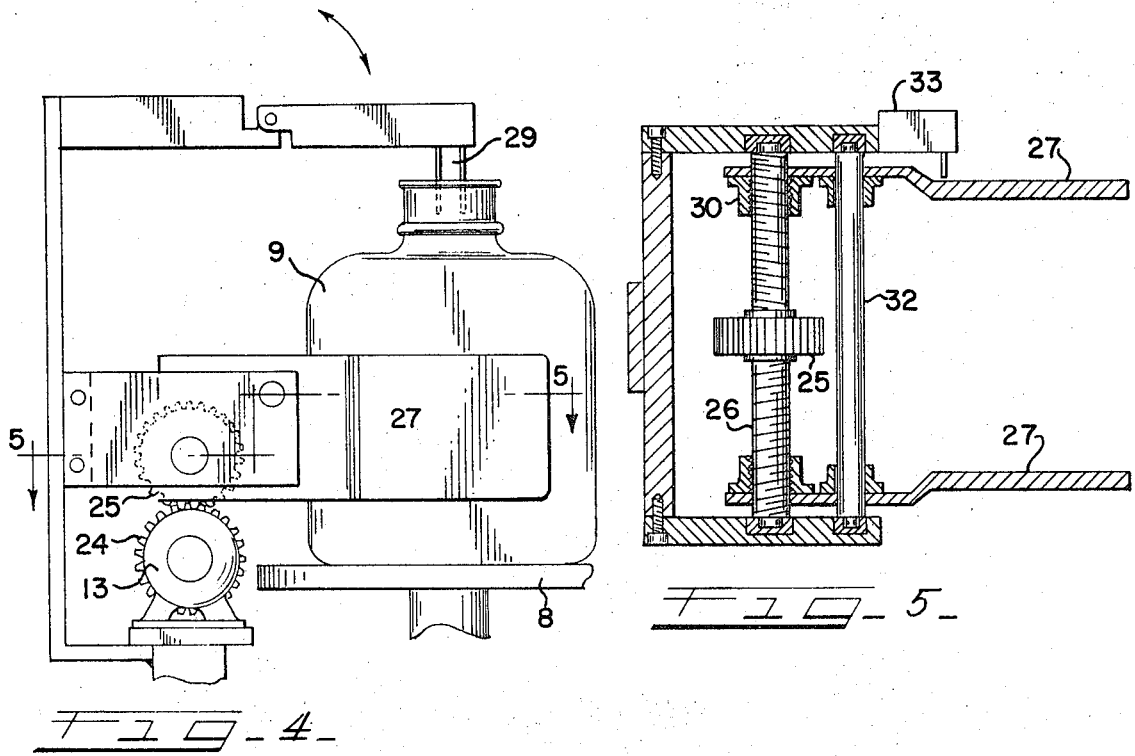
FIG. 4.
FIG. 5.
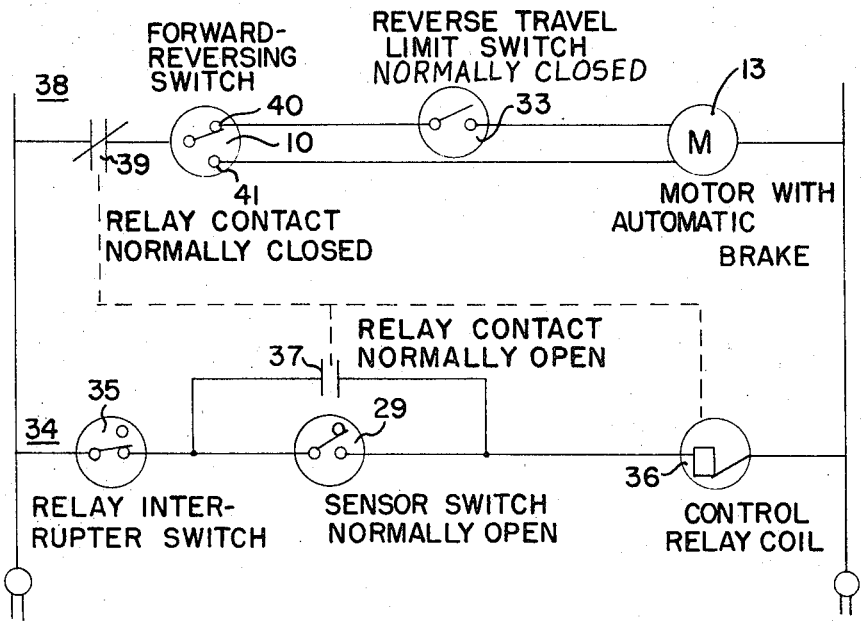
FIG. 6.
INVENTOR
HERBERT S. RUEKBERG
BY Andrew Mitchell
ATT'Y

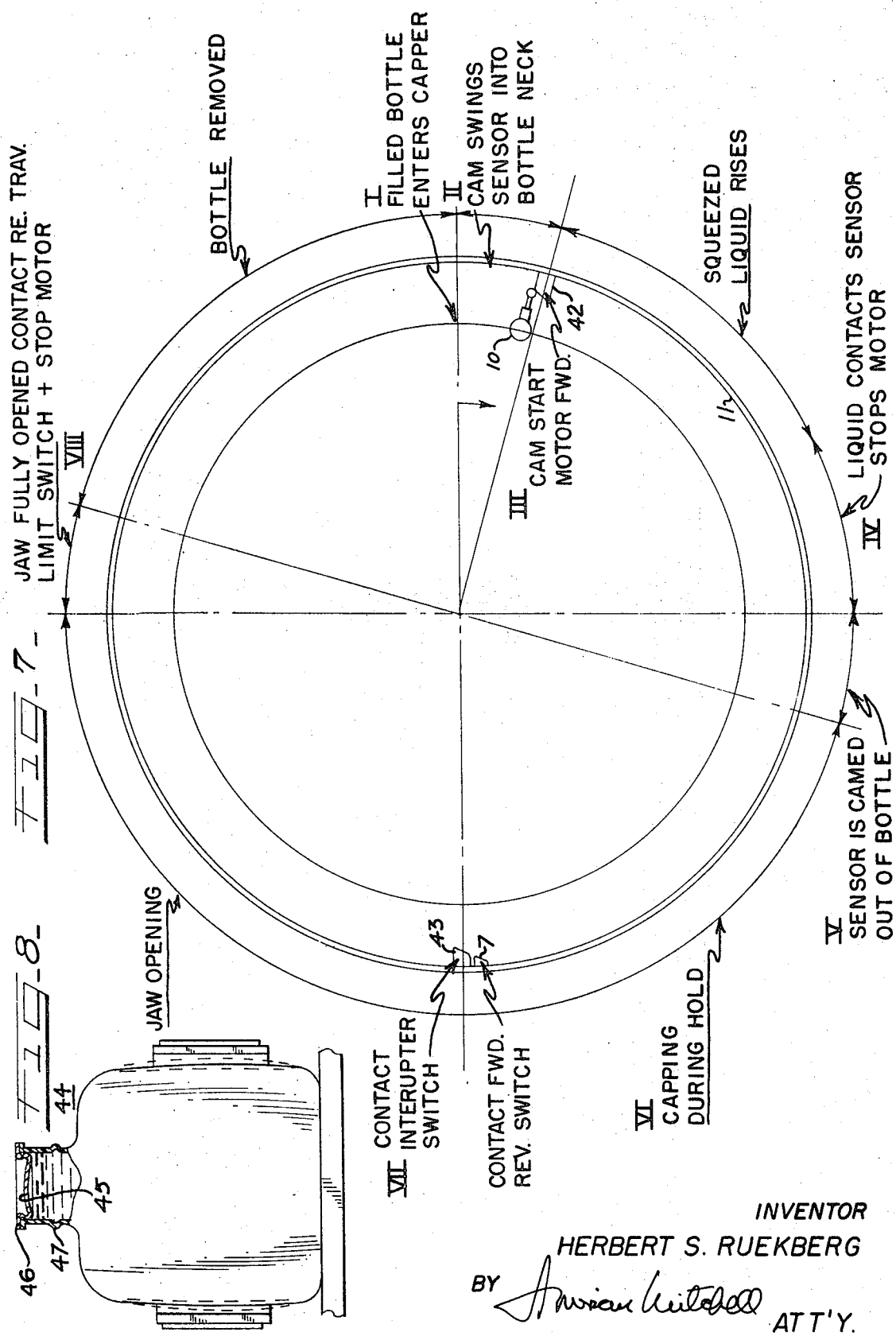

METHOD AND MEANS FOR FILLING AND SEALING A FLEXIBLE CONTAINER

My invention relates to a machine and method for filling, capping and sealing plastic bottles and more particularly to a machine and method for filling, squeezing and sealing plastic milk bottles to discourage tampering and give an indicator to show leaks, if any, in the bottle seal.

Up to this time, it has been difficult to fill plastic bottles, for example, half gallon and gallon milk bottles, with a correct amount of material and retain uniformity in liquid level because plastic bottles vary in size from bottle to bottle even though they may have been manufactured by the same machine. Thus, if the same amount of liquid is present in each bottle the apparent level of the contents may vary from bottle to bottle because of the variation in capacity in bottles present in such a manufactured series. The housewife is accustomed to seeing bottles filled to the top or at least to some uniform apparent height. Plastic bottles made by the same machine may vary in size from bottle to bottle in a manufactured series because each machine may have a variety of different molds and each mold may form bottles of a somewhat different size because of variations from mold to mold, variations in the heat of forming, variations in the mix of the plastic material and of other parameters. Since the bottles in a manufactured series come out in different sizes filling each of the bottles with a predetermined amount of liquid gives rise to a different level of liquid in each plastic bottle. When the customer who is about to purchase the bottle gives it a casual inspection, it appears to him that the bottles have different amounts of liquid each from the other because of the different liquid level in the various bottles. This apparent difference gives rise to customer dissatisfaction.

Another cause of bottle size variation is brought about by the use of printing on polyethylene bottles. If a polyethylene bottle is to have printing on it, the bottle is heat treated at the area where printing is to be placed. It is difficult to keep the amount of heat treating precisely the same from bottle to bottle and this heat treatment alters the capacity of a plastic bottle and introduces another variation in capacity between successive bottles of a series of plastic bottles. If a filling line composed of heat treated bottles and nontreated bottles are filled with the same amount of liquid, the variation in liquid height is apparent from bottle to bottle and becomes obvious to a customer. Customer dissatisfaction is indicated.

Plastic bottles are often made at the plant where they are to be filled. Most plastic bottles shrink during the first 24 hours of their existence. Thus, a bottle filled to a certain level immediately after being formed has a different level of liquid sometime later. Twenty-four hours after the formation and filling of a bottle the level of a given amount of liquid in a newly made plastic bottle is appreciably higher than the level immediately after the plastic bottle was filled. If the bottle is sealed internal pressure is generated and the seal may be broken.

Another source of variation in the size of plastic bottles is due to the cleansing process to which returnable bottles must be subjected. After newly formed bottles are used and returned they must be treated to cleanse them sufficiently to conform to the provisions of the sanitary code. The cleansing treatment may cause shrinkage in the size of the bottle. A normal filling run of both new and washed bottles may be mixed together in the filling line and be sold as a mixed batch to retail sales outlets. If the bottles are filled with a fixed amount of liquid, the variation in bottle size produces variations in the apparent height of the liquid in each of these bottles. Again customer dissatisfaction is indicated.

It is an object of this invention for plastic bottles of varying size to present a uniform filled appearance to the customer when filled with a certain volume of liquid no matter what the variation in the size of the plastic bottle from its expected value may be.

It is another object of the present invention to make a tamper-proof bottle and bottle closure.

It is a final object of my invention to provide a bottle and bottle closure assembly which gives an indication if there is a leak in the bottle seal.

In brief, my invention contemplates a method and means for filling and sealing plastic bottles by placing a predetermined amount of liquid into a slightly oversized plastic bottle and then squeezing the bottle until the liquid reaches a certain level in the bottle neck. Finally, the plastic bottle is sealed and the platens or other squeezing elements are moved away to give a series of bottles having apparently the same level of liquid in each one. When the individual bottle is sold, a customer may observe the liquid level in the bottle and in this way determine if the bottle has been opened or if the seal has leaked air into the bottle.

With the above and other objects in view that hereinafter appear, the nature of the invention will be more clearly understood by reference to the following detailed description, the appended claims and several views illustrated in the accompanying drawings.

In the drawing:

FIG. 1 shows an overall view of a section of the level adjusting and capping machine.

FIG. 2 shows a schematic top plan view of FIG. 1 and the filling machine.

FIG. 3 shows an enlarged view taken along the line 3-3 of FIG. 1.

FIG. 4 shows a plastic bottle having a liquid level detector inserted into the top of the bottle.

FIG. 5 shows a section view along the line 5-5 of FIG. 4.

FIG. 6 shows the control circuit diagram for the apparatus.

FIG. 7 shows diagrammatically the programming of the operations for the apparatus.

FIG. 8 shows the bottle walls equalizing with a convex-concave cap as a seal.

The apparatus of FIG. 1 shows a partial cross section of a level adjusting and sealing apparatus of my invention. The radial arms or disc assembly 1 is turned about a vertical post 2. Mounted at six or more places along the edge of the disc 1 are journals 3 in which a vertically reciprocal rod 4 slides. At the bottom of the rod is fixed a roller 5 or some other element to allow the bottom of the rod to pass freely over the stationary table 6 and any rising cam as the disc 1 revolves. At the top of the reciprocal rod 4 is a platform 8 for supporting the filled bottle 9 to be sealed. Fastened to the rod 4 is a single-pole double-throw forward and reversing switch 10 which is tripped by a cam 7 mounted on fence 11 and located in the path of switch assembly 10. A reversible motor 13 (FIG. 3) for operating the squeezing mechanism 14 is mounted to one side of the platform. Electric power to operate the squeeze mechanism 14 is supplied through slip rings 15 to the central rotating shaft and fed from the slip rings 15 by conventional means to the control circuit device 16 located on each arm convenient to each of the squeezing mechanisms.

For purposes of illustration this machine is shown in FIG. 2 as having six positions, 17—22. Located adjacent the machine is a liquid filler 23 for filling each of the plastic bottles 9 with a predetermined amount of liquid before capping. Then the plastic bottles are transported by conveyor means (not shown) to the first position in the capping machine. The liquid filler 23 is shown diagrammatically and may be any of the conventional metering devices or may be a valve controlled by a weighing scale. In any case, whether a liquid metering device or weighing scale is used, a predetermined amount of liquid is measured into the container before it passes to the capping machine. At this point the level of liquid in the oversized bottles is always lower than the level at the time of sealing.

The arrangement of the motor 13, gears 24, 25, double acting screw 26 and platens 27 of my apparatus are shown in FIGS. 3, 4 and 5. Attached to each of the platens 27 is a threaded nut 30 or 31 which operates to move the platens in a horizontal direction toward or away from each other when the screw 26 is rotated. The screw 26 is threaded in opposite directions starting from the screw ends toward the middle of the screw. The direction of rotation of the oppositely threaded screw 26 is controlled by motor 13 through gears 24 and 25. After the plastic bottle 9 has been positioned on the platform 8 (FIG. 4) a liquid level detection element 29 is swung into the top of the bottle 9. This liquid level detector 29 may be any of a variety of types found in the U.S. Patent Office classification system under Class 73, Subclass 290 and related subclasses. Ordinarily, the liquid level is determined with relation to the top of the bottle because for a most desirable result the level of the liquid should be adjacent the top of the bottle. However, it may be gauged as a predetermined distance from the bottom of the bottle if it is desired. In any case, after the liquid level detector is in place, the platens 27 begin to move together toward the center of the bottle squeezing the thin flexible sides of the bottle. As the walls of the container come into closer proximity, the liquid in the bottle rises until the liquid in the neck of the bottle is at a certain level which may be measured from the top or bottom of the plastic bottle. When the level in the neck of the bottle has reached a suitable height, the liquid level detector 29 acts as a control element to discontinue platen motor operation and stop the movement of the platens. If the liquid level detector is adjusted so that the level is allowed to come up near the bottle cap then each of the bottles after capping appears to be uniformly filled to capacity and the customer is satisfied.

Details of the squeezing apparatus are shown most clearly in FIGS. 3, 4 and 5 where two meshing gears 24, 25 are operated by motor 13 to cause rotation of the oppositely threaded screw 26. The gear 25 is splined to the screw and rotation of the gear 25 causes the rotation of the screw and consequent motion of the platens 27 in or out as the threaded nuts 30 and 31 move in or out in response to rotation of gear 25. The squeezing arms or platens 27 slide on guide shaft 32. In this way, the squeezing arms 27 may be moved toward each other by rotation of the motor 13 in one direction and moved away from each other by rotation of the motor in the opposite direction. As the arms move apart they actuate reverse travel limit switch 33 to stop motor 13.

The control circuit for each bottle position is shown in FIG. 6. One of these circuits is mounted near each of the platen motors. When the machine operates properly, the squeezing motor 13 moves the platens 27 together to the point where the liquid has reached an appropriate level, then the motor is stopped to hold the platens at a fixed position until the bottle has been sealed. After the bottle has been sealed or capped, the motor is reversed and moves its platens or arms back to an appropriate limit position so that the bottle is released and may be removed. The control circuit has two electrically parallel branches each composed of a series of elements. A first branch 34 has a relay interrupter switch 35, a normally open sensor switch 29, and a control relay coil 36 mounted in electrical series. The sole purpose of branch 34 is to control relay contact 39. Connected electrically across the sensor switch 29 is a control relay contact 37. Relay contact 39 and relay contact 37 are mechanically connected to relay coil 36 so that energization of coil 36 causes movement of the relay contacts. The other branch 38 has normally closed relay contact 39, forward and reversing single-pole double-throw switch 10 and motor 13 mounted in electrical series. The normally closed reverse travel limit switch 33 is electrically connected in series between the reversing terminal 40 and the motor 13. Motor 13 has an automatic brake mechanism. When the forward terminal 41 of the single-pole double-throw switch 10 is closed, the motor runs in one direction and alternatively when the reverse side 40 is closed the motor runs in the opposite direction. Sensor switch 29 is normally open, and closes when the level of liquid in the plastic bottle has reached a certain height.

The programming and operation of my bottle level adjusting and sealing device is shown in FIG. 7. For convenience of discussion, the programming is divided into eight operations. As the first operation, at about the position I shown in the FIG., the filled bottle enters the machine. In the second operation, a cam swings the liquid level sensor into the bottle neck. In the third operation stationery cam 42 actuates the forward-reversing switch 10 to start squeezing the plates 27 moving in a closing direction. Operation two is optionally before operation three. The plates or arms 27 squeeze bottle 9 until the liquid rises to a predetermined level when the liquid contacts the sensor switch 29 causing the fourth operation i.e. stopping the motor by closing sensor switch 29 which activates control relay coil 36 thus closing contact 37 and opening contact 39. As the fifth operation, the liquid being now at an appropriate level, the sensor 29 is cammed out of the bottle. In the sixth operation the bottle is sealed while the plates 27 are held stationery because screw 26 is not turning and the level of the liquid in the bottle is fixed at a predetermined height. In the seventh operation the motor direction is reversed by cam 7 while a separate cam 43 contacts interrupter switch 35 deactivating control relay coil 36, opening relay contact 37 and closing relay contact 39. The platens 27 move apart and release the bottle. As the arms of platens move apart one of them opens the normally closed limit switch 33 thus switching off the motor and stopping movement of the platens. The bottle is now removed from the bottle level adjusting and sealing machine and is conveyed to the next operation.

A brief description of the operation of the control circuit considered in conjunction with FIGS. 6 and 7 is as follows:

When the bottle enters the sealing machine the forward-reverse switch 10 is in reverse position, the sensor switch 29 is open, relay contact 37 is open and the reverse travel limit switch 33 is open. Now at position I the bottle enters the machine. At point II the sensor 29 is placed into the neck of the machine. Shortly thereafter, at point III forward-reverse switch 10 is shifted to forward position by a cam 42 which is fixed to the frame 11 of the capping machine. Cams attached to the frame may operate control circuit switches as they pass. The motor starts the jaws moving in an inward direction. The normally closed reverse travel limit switch 33 closes as the jaws move inwardly. At position IV the liquid level has risen closing the sensor switch 29 which in turn activates the control relay coil 36 to open the contact 39 and stop motor 13. Contacts 37 close keeping the relay coil 36 activated even after the liquid level sensor switch 29 is lifted out of the liquid. At position V the sensor 29 is mechanically removed from the bottle neck. The mechanical action of the sensor in its insertion and removal is independent of the direct operation of the control circuit shown in FIG. 6 and is moved in and out mechanically by cams. At position VI the bottle 9 is capped or sealed while the platens 27 are held fixed. At position VII the fixed cam 7 shifts the single-pole double-throw switch 10 to reverse, and the fixed cam 43 momentarily opens relay interrupter switch 35 to deactivate control relay coil 36 thus opening relay contact 37 and closing relay contact 39 causing the motor 13 to start in the reverse direction to withdraw the platens. This operation continues until one of the platens contact the reverse limit switch 33, opens it and stops the motor at position VIII.

As may be seen most easily in the embodiment of FIG. 8 the cap 44 may be a convex-concave type to allow pressure to be exerted on its top side 45 without rupturing or deflecting the cap. As the pressure is exerted on the top side in this type cap, the cap is more securely sealed into the top of the bottle because the rim 46 of the cap is pushed outwardly against the sides of the bottle neck. When squeezing platen pressure is released and the platens are withdrawn a distance from the bottle, a pressure differential is applied downwardly across the sealing element. In this way, the bottle closure is retained in position by a negative pressure from inside the bottle. Any of a variety of bottle closures such as, a plug-type or diaphragm cap may be used depending upon the situation. When platen support is removed the bottle settles somewhat and the walls of the bottle flex out until they reach an equilibrium condition.

Although this type sealing means appears most advantageous, I contemplate that any sealing closure or means may be used and the atmospheric pressure tends to hold such a means in place.

The squeezing techniques may differ. These drawings show two squeezing platen, but one, two, or more may be used or the bottle may be twisted. With some bottle shapes, the pressure can be applied vertically, exerting pressure downwardly against ring 47, FIG. 8, during squeezing. This would also stabilize the bottle against distortion during the capping operation.

Other means for raising the liquid level in the bottle such as evacuating the air from the top of the bottle also fall within the scope of my invention.

Since the bottle has a considerable reserve capacity and the level of the liquid in the sealed bottle is up near the bottle closure when the bottle is sealed, it is readily appreciated that if the bottle closure is removed the level of the liquid in the bottle goes down. As pointed out above, the wall of the plastic bottle is thin and it is apparent that flexing of the wall by pressure of the hand when gripping the bottle prior to pouring may displace milk from the container. By use of my method the level of the liquid is lowered when the bottle is opened and there is less likelihood that gripping and lifting the bottle by hand will cause spillage from the bottle.

Some bottles today have handles to minimize this problem. However, handles increase the cost of the bottle and increase foaming during filling. Lowering of the liquid level from the top also makes pouring easier because there is less likelihood of spillage over the top of the plastic bottle at the beginning of the pour.

An advantage of my method of filling and capping a plastic bottle is that a customer can tell at a glance whether the bottle has been opened or whether the seal has leaked because the level of liquid in the bottle is low if either situation has occurred.

Another advantage is that when the bottle is opened the level of liquid in the bottle drops and makes for easier pouring.

Another advantage is that in the feed line of any series of plastic bottles the bottle sizes vary somewhat and by using my invention each bottle which is filled with a fixed amount of liquid appears essentially like each other bottle.

A final advantage is that my system is economical because it is not necessary to sort the bottles for size in order to give a nearly uniform appearance to the filled bottles when they are distributed to sales outlets.

The foregoing is a description of an illustrative embodiment of the invention and it is applicant's intention in the appended claims to cover all forms which fall within the scope of the invention.

I claim:

1. A method of filling and adjusting the liquid level in a series of overcapacity flexible containers having differences of capacity from one to another which comprises the steps of:
   placing a predetermined amount of liquid into a flexible container,
   altering the shape of said container to cause the level of liquid in said container to rise, and
   ceasing said altering when the level of the liquid in said container rises to a predetermined position.

2. A method of filling and adjusting the liquid level in a series of overcapacity flexible containers having differences of capacity from one to another as set forth in claim 1 in which the step of altering the shape is accomplished by:
   flexing said container to reduce the volume of said container and cause the level of said liquid in said container to rise.

3. A method of filling and adjusting the liquid level in a series of overcapacity flexible containers having differences of capacity from one to another as set forth in claim 1 in which the step of ceasing said altering comprises the steps of:
   detecting when the level of the liquid in said container rises to a predetermined position in said container,
   halting said altering of the container shape when the level of the liquid in said container rises to said predetermined position in said container.

4. A method of filling and adjusting the liquid level in a series of overcapacity flexible containers having differences of capacity from one to another as set forth in claim 3 in which said step of detecting comprises the steps of:
   applying a liquid level sensing instrument to said container,
   transmitting liquid level information to a means for halting said altering when the liquid in said container has risen to a predetermined level, and
   removing said liquid level sensing instrument from said container.

5. A method of filling and adjusting the liquid level in a series of overcapacity flexible containers having differences of capacity from one to another as set forth in claim 4 which comprises the additional step of:
   sealing said container whereby after releasing said container said liquid level holds at a uniform level.

6. A method of filling and adjusting the liquid level in a series of overcapacity flexible containers having differences of capacity from one to another as set forth in claim 5 in which said sealing comprises the step of:
   placing a closure upon the opening of said container whereby said closure seals said container and when said container is released the liquid is held at a uniform level.

7. A method of filling and adjusting the liquid level in a series of overcapacity flexible containers having differences of capacity from one to another as set forth in claim 5 which comprises the additional step of:
   releasing said container so that said container may assume an equilibrium.

8. A method of filling and adjusting the liquid level in a series of overcapacity flexible containers having differences of capacity from one to another which comprises the steps of:
   placing a predetermined amount of liquid into a flexible container;
   moving a part of said container relative to another part so that the level of liquid in said container rises;
   halting said moving when the level of the liquid in said container rises to a predetermined position;
   sealing said flexible container; and,
   removing any restraints on said moved parts of said container whereby said container is allowed to come into an equilibrium position.

9. A method of filling and adjusting the liquid level in a series of overcapacity flexible containers each having a neck and having differences of capacity from one to another which comprises the steps of:
   placing a predetermined amount of liquid into a flexible container,
   flexing said container to reduce the volume of said container and cause the level of said liquid to rise in said container, and
   halting said flexing when the level of the liquid in said container rises to a predetermined position.

10. A method of filling and adjusting the liquid level in a series of overcapacity flexible containers having differences of capacity from one to another which comprises the steps of:
   placing a predetermined amount of liquid into said container,
   flexing said container to cause the level of the liquid in said container to rise,
   determining the instant when the level of the liquid in said container rises to a predetermined position in said container,
   halting said flexing at said instant,
   placing a closure element over the opening to close said opening and freeing said container whereby said flexure is allowed to come into equilibrium.